United States Patent [19]

Loup

[11] Patent Number: 5,106,018

[45] Date of Patent: Apr. 21, 1992

[54] HEATING AND VENTILATING APPARATUS FOR THE CABIN OF AN AUTOMOTIVE VEHICLE

[75] Inventor: Didier Loup, Maurepas, France

[73] Assignee: Valeo Thermique Habitacle, Le Mesnil-Saint-Denis, France

[21] Appl. No.: 669,016

[22] Filed: Mar. 13, 1991

[30] Foreign Application Priority Data

Mar. 14, 1990 [FR] France ................ 90 03279

[51] Int. Cl.⁵ ........................ B60H 1/04; B60H 1/00
[52] U.S. Cl. ................... 237/12.3 B; 237/12.3 A;
165/16; 165/22; 165/42; 165/43; 454/126;
454/160
[58] Field of Search ............... 165/16, 22, 42, 43;
98/2.01, 2.08, 2.09, 2.11; 237/12.3 A, 12.3 B, 2 A

[56] References Cited

U.S. PATENT DOCUMENTS

| | | |
|---|---|---|
| 4,289,195 | 9/1981 | Bellot et al. ........................... 165/16 |
| 4,465,123 | 8/1984 | Sarsten et al. ......................... 165/16 |
| 4,582,252 | 4/1986 | Yoshiyuki . | |
| 4,842,047 | 6/1989 | Sakurada et al. . | |
| 4,852,638 | 8/1989 | Hildebrand et al. . | |
| 4,947,735 | 8/1990 | Guillemin ............................ 98/2.08 |
| 4,972,992 | 11/1990 | Scheidel ................................. 98/2.08 |

FOREIGN PATENT DOCUMENTS

| | | |
|---|---|---|
| 0296555 | 12/1988 | European Pat. Off. ........ 237/12.3 A |
| 2648663 | 5/1978 | Fed. Rep. of Germany ....... 98/2.08 |
| 2836800 | 3/1980 | Fed. Rep. of Germany ....... 98/2.09 |
| 3421323 | 12/1985 | Fed. Rep. of Germany ....... 98/2.08 |
| 2503056 | 10/1982 | France . |
| 3805168 | 8/1989 | German Democratic Rep. ... 165/43 |
| 0026008 | 2/1982 | Japan .................................... 165/42 |
| 1227334 | 4/1971 | United Kingdom ................. 98/2.08 |
| 2100417 | 12/1982 | United Kingdom ................. 98/2.08 |

*Primary Examiner*—John K. Ford
*Attorney, Agent, or Firm*—Dennison, Meserole, Pollack & Scheiner

[57] ABSTRACT

This apparatus includes a housing defining within it a first conduit having at least one internal bulkhead extending partially within a distribution chamber and at right angles to the pivot axis of a distribution valve so as to define at least two adjacent air outlets. The housing also defines within it a second conduit having a further air outlet. The distribution valve comprises vanes which are offset axially and circumferentially from each other, for selectively controlling the distribution of air through the outlets of the first conduit, together with a vane for controlling the distribution of air through the outlet of the second conduit.

8 Claims, 2 Drawing Sheets

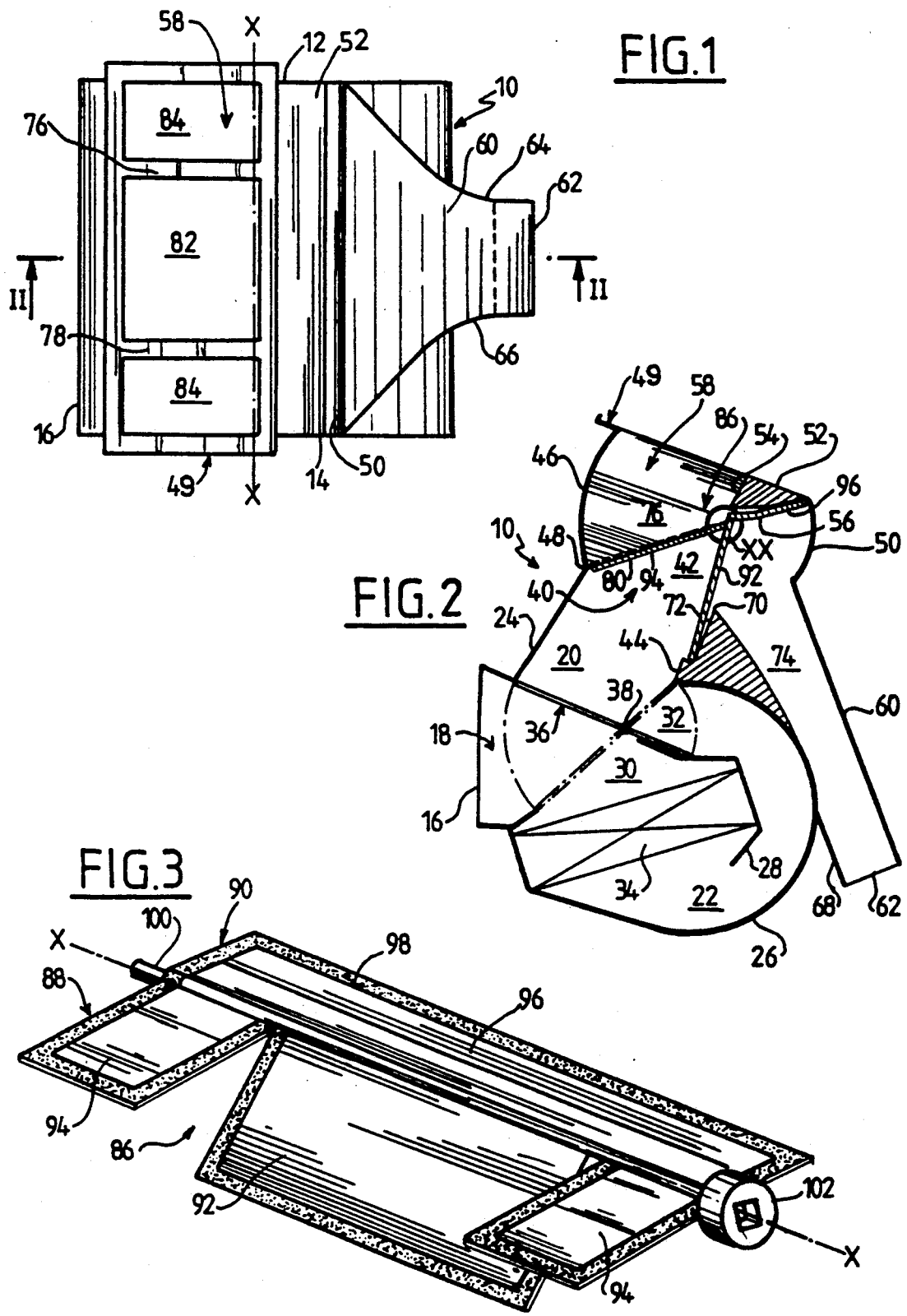

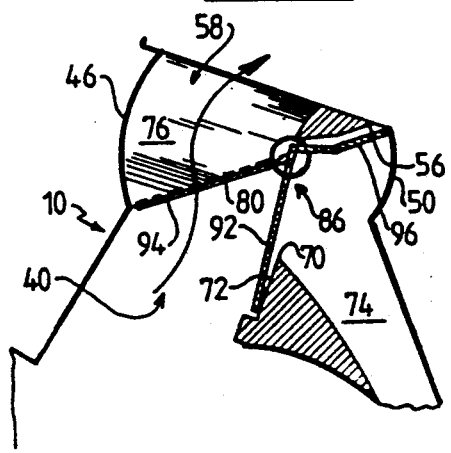
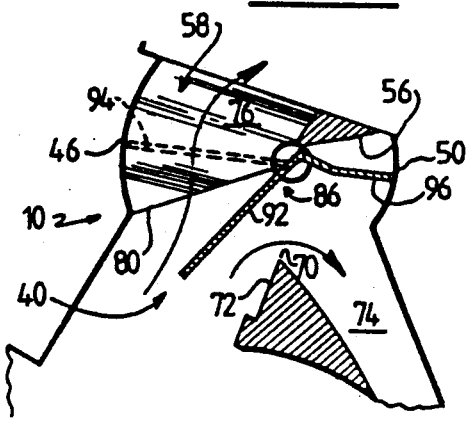
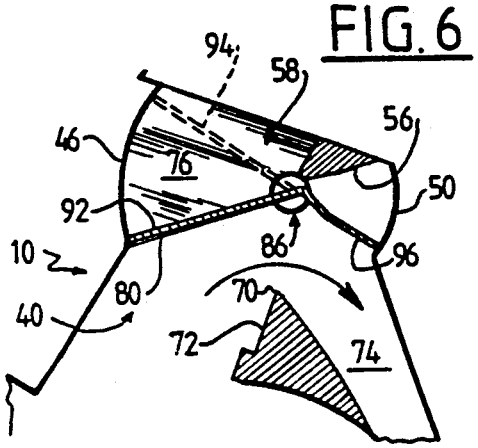
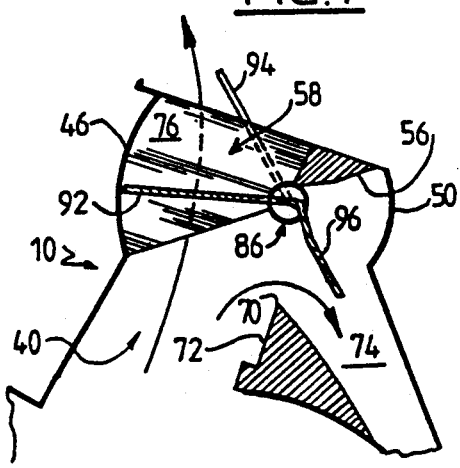
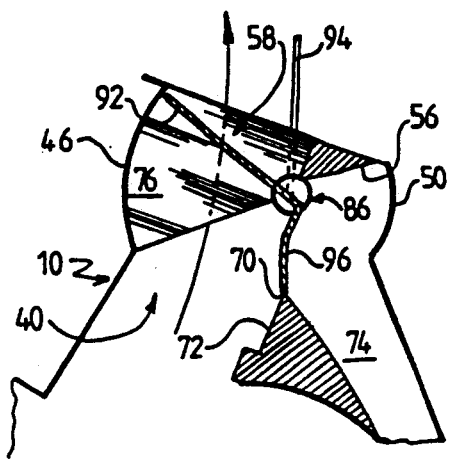

HEATING AND VENTILATING APPARATUS FOR THE CABIN OF AN AUTOMOTIVE VEHICLE

FIELD OF THE INVENTION

This invention relates to a heating and ventilating apparatus for the cabin of an automotive vehicle, comprising a housing defining a distribution chamber and an air inlet for introducing fresh or heated air into the distribution chamber, together with air outlets for distributing the said fresh or heated air into different zones of the cabin, a flap-type distribution valve being mounted for pivoting movement about an axis within the distibution chamber so as to regulate the distribution of the air selectively through the said air outlets.

BACKGROUND OF THE INVENTION

In known apparatuses of this type, it is common to provide an air outlet in the form of a fresh air vent at the level of the dashboard or fascia panel of the vehicle, another air outlet in the form of a windshield de-icing and de-misting vent, and a further air outlet in the form of a vent in the lower part of the cabin of the vehicle. One arrangement of this kind is known from U.S. Pat. No. 4,465,123. This known apparatus has the advantage of being controllable by a single distribution valve, in place of the two valves which are commonly found, so as to distribute the air selectively through the various outlets. However, because it has only a single distribution valve, this apparatus offers only a limited number of distribution modes for fresh or heated air through the air outlets of the apparatus, whereas specifications for automobile manufacturers now require apparatus of this type to be capable of providing at least five different air distribution modes, which is not possible with the above mentioned arrangement of the prior art.

It is therefore an object of the invention to provide an apparatus of the kind defined under "Field of the Invention" above, which, while enabling only a single distribution valve to be used, provides at least five different air distribution modes.

DISCUSSION OF THE INVENTION

In accordance with the invention, in such an apparatus:
  the housing defines within itself a first conduit which includes at least one internal bulkhead extending partly within the distribution chamber and at right angles to the pivot axis of the distribution valve, so as to define at least two said air outlets;
  the housing further defines within itself a second conduit which has a further said air outlet; and
  the distribution valve comprises a first vane means and a second vane means which extend respectively on either side of the pivot axis, the first vane means of the valve comprising at least two vanes which are offset from each other axially and circumferentially, in order to control selectively the distribution of the air through the outlets of the first conduit, the said second vane means of the valve comprising a vane for controlling the distribution of air through the outlet of the second conduit.

Since the valve in apparatus according to the invention includes vanes which are offset circumferentially and axially from each other to control the various outlets, it is thus possible to provide five different distribution modes according to the rotational position of the valve.

In one preferred embodiment of the invention, the first conduit comprises two internal bulkheads defining three adjacent air outlets, namely a central outlet and two side outlets, and the first vane means of the distribution valve comprises three vanes which are offset axially and circumferentially from each other, namely a central vane and two side vanes for controlling, respectively, the said central outlet and the said side outlets, while the said second vane means of the distribution valve comprises a single vane for controlling the outlet of the second conduit.

Preferably, the two side vanes are substantially in the same plane, while the central vane is offset circumferentially with respect to the plane in which the two side vanes lie, and the single vane of the said second vane means of the valve is substantially in the same plane as that in which the side vanes lie.

Preferably, the central air outlet feeds an air outlet vent in the fascia panel of the vehicle, while the two side air outlets feed de-icing/de-misting vents for the windshield of the vehicle, and the outlet of the second conduit feeds an air vent in the lower part of the vehicle cabin.

An embodiment of the invention will now be described, by way of example only and with reference to the accompanying drawings.

BRIEF DESCRIPTION OF THE DRAWINGS

FIG. 1 is a top plan view of one heating and ventilating apparatus in accordance with the invention.

FIG. 2 is a view in cross section taken on the line II—II in FIG. 1.

FIG. 3 is a perspective view of the distribution flap valve of the apparatus of FIGS. 1 and 2.

FIGS. 4 to 8 are partial views, shown in cross section and generally similar to that of FIG. 2, but showing five different positions of the distribution flap valve, giving five different distribution modes.

DESCRIPTION OF A PREFERRED EMBODIMENT OF THE INVENTION

The apparatus shown in FIGS. 1 and 2 includes a housing 10, which is preferably formed by moulding in plastics material and which has two side walls 12 and 14 parallel to each other as shown in FIG. 1. The side walls 12 and 14 are connected together through various walls having parallel generatrices. The housing 10 includes a connecting mouth 16, generally rectangular in cross section and extending over the whole width of the housing between the walls 12 and 14. The mouth 16 is arranged to be connected to the outlet of a motorised fan unit (not shown) for delivering fresh air into the housing 10. The connecting mouth 16 discharges into a fresh air inlet duct 18 which, in known manner, feeds a branch 20 for transmission of fresh air and a branch 22 for air heating (FIG. 2).

The branch 20 extends upwardly within a flat wall 24, and two parallel side walls. The wall 24 extends over the whole width of the housing and is joined on to the mouth 16. The branch 22 extends generally downwardly within a wall 26 and two parallel side walls. The wall 26 extends over the whole width of the housing, and is again joined on to the mouth 16. The branch 22 is generally U-shaped, being delimited on the outside by the wall 26 and on the inside by a partition wall 28 extending over the whole width of the housing. The two ends of the U-shaped branch 22 define, respectively, an inlet section 30 and an outlet section 32, which communicate, upstream of the former and downstream of the latter, with the fresh air transmission branch 20.

The branch 22 contains within it a heat exchanger 34, which preferably consists of a radiator through which engine cooling fluid of the automotive vehicle flows. The heat exchanger 34 heats the air which passes through the inlet section 30 of the branch 22 and leaves through its outlet section 32.

The apparatus also includes a mixing flap valve 36, which is pivotally mounted about a transverse axis 38. The valve 36 is arranged at the junction of the inlet duct 18, the fresh air transmission branch 20 and the air heating branch 22, so as to distribute the air stream flowing in the branches 20 and 22 as required. The valve 36 is able to pivot between an extreme position (shown in full lines) and another extreme position (shown in phantom lines). In the first of these positions, the air passes only through the branch 22 in order to be heated. In the other extreme position, the air passes only through the branch 20 without being heated. All the intermediate positions are of course obtainable in order to adjust the distribution of the air between the branches 20 and 22, and therefore the temperature of the air.

The branches 20 and 22 are open at their outlet ends into a mixing zone 40 which is also the air inlet of a distribution chamber 42. The air inlet 40 extends over the whole width of the housing and is limited in the perpendicular direction by the wall 24 and by a wall portion 44, which faces the wall 24 and which joins the downstream end of the wall 26 at the outlet end 32 of the branch 22.

The distribution chamber 42 extends over the whole width of the housing and is limited by a cylindrical wall 46 the cross section of which is an arc of a circle centered on an axis XX, which is perpendicular to the parallel side walls of the housing 10. The wall 46 is joined at its lower or inner end 48 to the wall 24, and is also joined at its other end to an outlet vent 49 which is generally rectangular in shape.

On the opposite side of the axis XX, the chamber 42 is limited by a cylindrical wall 50, extending over the whole width of the air handler and having the cross section of an arc of a circle, which is again centered on the axis XX. The wall 50 is connected with a flat wall 52 extending over the whole width of the housing and joined to the outlet vent 49. This wall 52 is connected at the side of the vent 49 with another wall 54, which extends into the chamber 42 to terminate in close proximity with the axis XX, and which is joined to a further internal wall 56. The latter is joined to the wall 52 at its other end. The walls 46 and 54 together define a first conduit 58 which brings the mixing chamber 42 into communication with the outlet vent 49.

The wall 50 is also joined with a further flat wall 60, which terminates at an outlet 62 comprising a generally rectangular vent the width of which is smaller than that of the housing 10. The wall 60 is joined at its sides to two side walls 64 and 66, which are themselves joined together through a wall 68 opposite the wall 50, as can be seen in FIG. 2. The wall 68 joins the wall 26 and is extended into the mixing chamber 42. The wall 68 is joined along a free edge 70 with a return wall 72 which is itself joined to the wall 44. The walls 60, 64, 66 and 68 together define a second conduit 74 which brings the mixing chamber 42 into communication with the outlet vent 62.

The first conduit 58 is divided by two transverse bulkheads 76 and 78 extending at right angles to the axis XX. The wall 76 joins the walls 46 and 54 together (see FIG. 2), and reaches in its upper part into the outlet vent 49. The wall 76 is limited at the bottom by an edge 80 which is substantially radial with respect to the axis XX. The same applies to the bulkhead 78. The bulkheads 76 and 78 thus define three air outlets within the first conduit 58, namely a central outlet 82 and two side outlets 84, each of these three outlets being rectangular in shape as shown in FIG. 1.

In this example, the central outlet 82 is arranged to feed a vent in the fascia or dashboard of the vehicle, and the two side outlets 84 feed de-icing and de-misting vents for the windshield. The outlet 62 of the second conduit 74 feeds a vent in the lower part of the cabin of the vehicle corresponding to the level of the feet of the occupants (the so-called "feet" position").

The air distribution between the various outlets described above is obtained by means of a single flap-type distribution valve 86, which is mounted for rotation about the axis XX. The flap valve 86, as shown in FIGS. 2 and 3, includes a first vane means 88 and a second vane means 90, which are arranged on either side of the axis XX. The vane means 88 comprises a central vane 92, generally rectangular in shape and adapted to control the central outlet 82, together with two side vanes 94 for controlling the two side outlets 84. The second vane means 90 comprises a single vane 96 for controlling the second conduit 74. As can be seen from FIG. 3, the vanes 94 are mounted so that they are offset from the vane 92 both axially and circumferentially, with respect to the axis XX, the vanes 94 being also spaced apart axially from each other. The two side vanes 94 are in the same plane as each other, while the central vane 92 is circumferentially offset with respect to the plane of the two side vanes. The single vane 96 of the second flap portion 90 of the flap valve is, in this case, in substantially the same plane as are the side vanes 94, though it could be axially offset from that plane if necessary.

FIG. 3 also shows that the two side vanes 94 and the central vane 92 are in the form of generally rectangular plates, each attached at one of its sides to the pivot bar, defining the pivot axis XX, of the flap valve 86. The other three sides of each of these vanes are arranged to slide sealingly on the appropriate internal surfaces of the walls and/or the internal bulkheads of the first conduit 58. The vane 96 which constitutes the second vane means 90 of the valve 86 also comprises a generally rectangular plate, and has one side attached to the pivot bar, its other three sides sealingly slide on the internal walls of the second conduit 74.

It should be understood that sealing between the various vanes and the surfaces of the various walls and bulkheads must be as good as possible when the conduits concerned are closed, while allowing the vane to be moved easily into other positions. To that end, the three sides of each vane that are not attached to the central pivot bar are provided with a seal 98, which may for example be moulded into place. The axis XX of the flap valve 86 is extended on one side by a pivot 100, while on the opposite side it is extended by a cylindrical bearing 102 which includes a driving means for the flap valve, such as a square socket. The first vane means 88 of the flap, comprising the central vane 92 and the two side vanes 94, and the second vane means 90 comprising the vane 96, extend over the same width along the axis XX (FIG. 3).

Operation of the apparatus will now be described with reference to FIGS. 4 to 8. In the position shown in FIG. 4, the central vane 92 of the flap valve 86 bears against the wall 72 and closes the inlet end of the second conduit 74. The two side vanes 94, which then lie against the free edges 80 of the bulkheads 76 and 78, prevent air from gaining access to the side outlets 84. The vane 96 bears against the internal wall 56. Consequently, fresh or heated air which penetrates into the distribution chamber 42 through the inlet 40 is unable to escape except through the central outlet 82. The apparatus is here in the "fresh air" position, for ventilating the cabin through the fascia vents.

In the position shown in FIG. 5, the valve 86 is seen to have pivoted slightly in the clockwise direction. The central vane 92 is slightly spaced away from the return wall 72, but the side vanes 94 still cover the side outlets 84. The vane 96 slides against the inner surface of the wall 50. Consequently, fresh or heated air is able to escape both via the central outlet 82 and via the outlet vent 62 of the second conduit 74. Here the apparatus is in the position designated "fresh air and feet".

In the position shown in FIG. 6, the flap valve 86 has once again pivoted. The central vane 92 now lies at the level of the lower edges 80 of the bulkheads 76 and 78, and thus covers the central opening 82. The side vanes 94 close the side outlets 84, and the vent 96 still slides against the inner face of the wall 50. In consequence, the fresh or heated air is only able to escape via the conduit 74 and through the outlet vent 62. The apparatus is then therefore in the "feet only" position.

In the position shown in FIG. 7, the flap valve 86 has pivoted once more in the same direction. The central vane 92 closes the contral outlet 82, while the side vanes 94 close the side outlets 84 only partly. In addition, the vane 96 now partly closes the inlet end of the conduit 74. Part of the fresh or heated air will therefore escape via the two side outlets 84, with another part leaving via the outlet vent 62. Now the apparatus is therefore in the "de-icing and feet" position.

Finally, in the position in FIG. 8, in which the flap valve has rotated still further by a few degrees, the central vane 92 still closes the central outlet 82, while the side vanes 94 now allow air to pass through the side outlets 84. In this position, the free edge of the vane 96 lies against the free edge 70, thus closing off the conduit 74. This is the "de-icing" position in which fresh or heated air is able to escape only through the side outlets 84.

What is claimed is:

1. Heating and ventilating apparatus for the cabin of an automotive vehicle, comprising a housing defining a distribution chamber within the housing, the housing comprising an air inlet of the distribution chamber, a first conduit leading from the distribution chamber, at least one internal bulkhead extending partially within the distribution chamber and defining at least a first air outlet and a second air outlet adjacent to each other, the housing further comprising a second conduit having a third air outlet and leading from the distribution chamber, the apparatus further including a flap-type distribution valve having pivot means defining a pivot axis, the housing having means mounting the pivot means in the distribution chamber, and the said at least one bulkhead extending at right angles to the said pivot axis, wherein the distribution valve comprises a first vane means and a second vane means extending respectively on either side of the pivot axis, the said first vane means comprising at least two vanes offset axially and circumferentially from each other for pivoting movement about the said axis in the said first conduit to control opening and closing of the first and second air outlets selectively, and the said second vane means comprising a vane movable pivotally disposed in the distribution chamber facing the second conduit, for pivoting movement about the said pivot axis to control the flow of air into the second conduit, and wherein said at least one bulkhead comprises two said internal bulkheads in the first conduit defining three said air outlets adjacent to each other, namely a central first air outlet and two second air outlets in the form of side outlets, the said first vane means comprising a central vane aligned with the central outlet and two side vanes aligned respectively with the side outlets, the central vane being offset axially and circumferentially from the side vanes, and the second vane means comprising a single continous vane.

2. Apparatus according to claim 1, wherein the said side vanes lie substantially in the same plane as each other, the central vane being inclined with respect to that plane, and the single vane of the second vane means being in substantially the same plane as the side vanes.

3. Apparatus according to claim 1, wherein each said conduit has parallel side walls, each vane being in the form of a generally rectangular plate having one side attached to the pivot means of the valve, with the other three sides of each vane being so disposed with respect to internal surfaces of the housing that the said central vane is moveable in sealing and sliding contact with the said bulkheads and the first conduit, the side vanes are moveable in sealing and sliding contact with a respective said bulkhead and with the first conduit, and the said single vane is moveable in sealing and sliding contact with the second conduit.

4. Apparatus according to claim 3, further comprising sealing means arranged on the said three sides of each vane.

5. Apparatus according to claim 1, wherein the said first and second vane means extend over substantially the same width as each other, parallel with the pivot axis.

6. Apparatus according to claim 1, wherein the first and second conduits are defined by walls having generatrices parallel to the pivot axis and by transverse walls perpendicular to the pivot axis.

7. Apparatus according to claim 1, wherein each said internal bulkhead has a terminal edge along the side thereof facing into the distribution chamber.

8. Apparatus according to claim 1, further comprising a fascia panel air vent, windshield de-icing and de-misting vents, and a vent for location in a lower part of a cabin of a vehicle, means connecting the said first air outlet of the apparatus to the fascia vent, means connecting the said second air outlet or outlets to the de-icing and de-misting vents, and means connecting the second conduit to the vent in the lower part of the cabin.

* * * * *